Jan. 8, 1924.
F. L. SCOTT
1,480,014
SELF CLEANING ROLLER DRILL
Filed Jan. 16, 1922
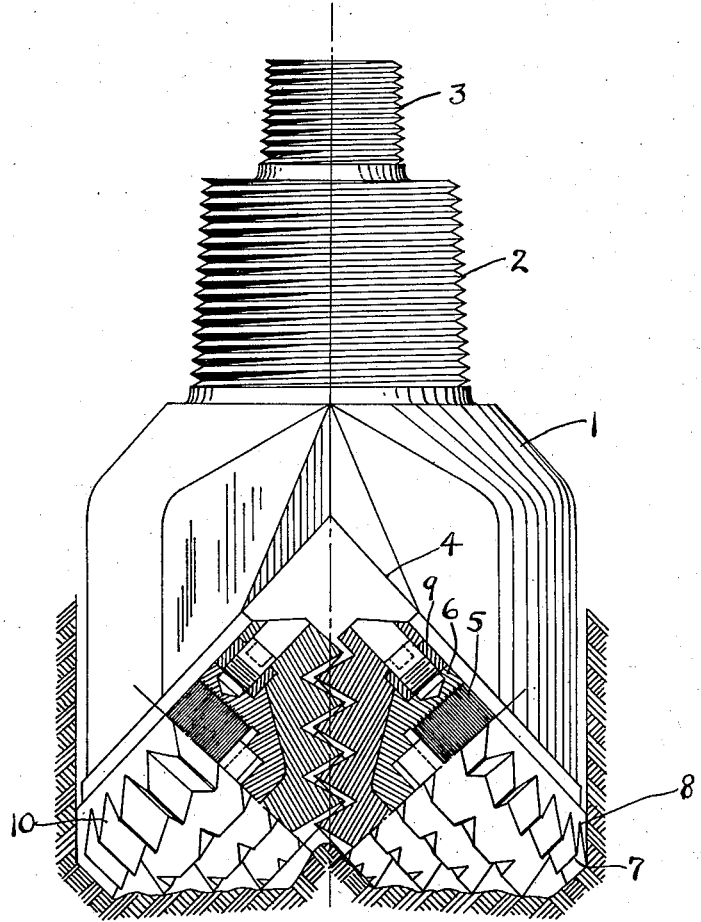
F. L. Scott, Inventor
By Jesse R. Stone
Attorney Patented Jan. 8, 1924.

1,480,014

UNITED STATES PATENT OFFICE.

FLOYD L. SCOTT, OF HOUSTON, TEXAS, ASSIGNOR TO HUGHES TOOL COMPANY, OF HOUSTON, TEXAS.

SELF-CLEANING ROLLER DRILL.

Application filed January 16, 1922. Serial No. 529,576.

*To all whom it may concern:*

Be it known that I, FLOYD L. SCOTT, a citizen of the United States, residing at Houston, Harris County, Texas, have invented a certain new and useful Improvement in Self-Cleaning Roller Drills, of which the following is a full, clear, and exact description, such as will enable others skilled in the art to which it appertains to make and use the same.

My invention relates to cutters for roller boring drills used in drilling wells for water, oil, gas, sulfur, etc. It is particularly applicable to drills adapted to work in hard formation.

An object of my invention is to provide a plurality of rolling cutters to be used on an earth-boring drill, these cutters to be so shaped and mounted as to cooperate to clear each other of material which would otherwise tend to adhere thereto, and thus clog the cutting action of the drill. This object I contemplate accomplishing by mounting the rolling cutters closely adjacent each other and so forming the cutting teeth thereon that said teeth will interfit without actual contact, and thus clear each other.

In the drawing I have shown a side elevation of a roller earth-boring drill having cutters thereon showing my invention, the said cutters being shown partly in central longitudinal section.

The form of drill shown in the illustration which I have used in connection with my invention, is a type of drill well known in the oil drilling industry, and is ordinarily called a cone bit. It is made up of a head, 1, having a threaded upper shank 2 thereon, and at the upper end of said shank 2 is a reduced upwardly extending nipple 3, also threaded for the attachment thereto of a lubricator such as is ordinarily used with this type of bit. The lower end of head 1, is provided with a transverse V-shaped slot 4. Each of the opposite flat sides of this slot 4 has a stub shaft or pin 5 formed thereon, to extend perpendicularly from the said face. In ordinary practice these pins extended would be at approximately right angles to each other.

Each of the pins is threaded for attachment thereto of a bushing or bearing member 6. This bearing member is threaded into attachment with the pin, 5. On the outer surface of the bushing 6 is mounted a cutter, 7, approximately frusto-conical in shape. The larger end of the cutter is beveled at 8 to bear against the side of the hole and to maintain the gage thereof. These cutters are retained in position upon the bushing by means of a locking washer 9. This washer is substantially the same as that shown in the prior patent to Godbold and Fletcher, Number 1320384, November 4th, 1919 and need not be further described.

It will be noted that these two cutters when mounted upon the head in the manner stated, have their adjacent sides lying practically within the central longitudinal axis of the drill. The teeth are formed upon the cutters circumferentially thereof in rows along the tapered surface of the cone. The teeth upon one cutter are formed to interfit with the teeth of the opposite cutter. For this reason the teeth are of practically the same gage, and the teeth upon one cutter are formed in rows at slightly different distance from the larger end than are those on the other, thus allowing the teeth upon one cutter to lie within the trough or groove formed between the teeth of the opposite cutter. It will be obvious that these cutting rollers will be formed in sets of two or more and the rows of teeth upon one cutter are positioned upon the cutter so that they will be offset slightly from those of the adjacent one, thus allowing the teeth to interfit as shown in the drawing. The rows of teeth thus formed are cut with groves 10 longitudinal of the teeth, to provide cutting edges adapted to act upon the bottom of the hole.

It is frequently found in the operation of drills with roller cutters thereon, that certain formations will adhere to the surface of the cutters and pack around the teeth in such manner that the cutters will fail to function. The head of the bit may become "balled up" with disintegrated material in such manner that no progress may be made with the drill without withdrawing the same from the well and clearing the cutters, and again inserting the drill into the well.

By forming the cutters with the teeth thereon in the manner above described, the teeth will act to clear each other of adhering material. The head of this drill is ordinarily rotated by means of a drill-stem in a clock-wise direction, as viewed from above. The cutters then roll upon the bottom of the well and it will be noted that the surface of one cutter which lies adjacent the surface of the other cutter, will be traveling in a different direction from that of the teeth on the opposite cutter. In this construction it will be clear that material lying in the groove of one of the cutters will be scraped away and removed therefrom by the teeth of the opposite cutter. This action will keep the cutters clear at all times and will avoid to a great extent the usual difficulties experienced with roller cutters in a sticky formation.

Further objects and advantages of this improvement will be obvious to one skilled in the art, without further description.

What I claim is new and desire to protect by Letters Patent is:

1. In the roller earth-boring drill the combination of a head, two opposite, approximately frusto-conical shaped cutting rollers mounted on the forward end thereof and circumferential rows of teeth of approximately equal size formed on each cutter, the teeth on one cutter being adapted to interfit between those of the other for the purpose described.

2. In a roller earth-boring drill, the combination of a head, two opposite approximately frusto-conical shaped cutting rollers mounted on the forward end thereof and circumferential rows of teeth on each cutter, those on one being formed at different distances from the end thereof than are those on the other cutter so that they may interfit without contact with each other, and be thus adapted to clear each other of material tending to adhere thereto during use.

3. In a roller earth-boring drill, a head, a plurality of approximately frusto-conical shaped cutting rollers thereon and circumferential rows of teeth on each cutter, those on one being formed to interfit with those of the other, said cutters being mounted and positioned adjacent each other so that the teeth of one cutter will clear material from the teeth of the other as said cutters rotate.

4. In a roller earth-boring drill, a head, a plurality of cutting rollers thereon, each cutter having cutting teeth thereon slightly offset relative to the teeth on the other so that said teeth may interfit during operation in the manner described.

In testimony whereof, I hereunto affix my signature, this the 10 day of January, A. D. 1922.

FLOYD L. SCOTT.